(12) United States Patent
Thomas

(10) Patent No.: US 7,236,773 B2
(45) Date of Patent: Jun. 26, 2007

(54) CONFERENCE CALL METHOD AND APPARATUS THEREFOR

(75) Inventor: Graham Thomas, Camberley (GB)

(73) Assignee: Nokia Mobile Phones Limited (FI)

( * ) Notice: Subject to any disclaimer, the term of this patent is extended or adjusted under 35 U.S.C. 154(b) by 1060 days.

(21) Appl. No.: 09/867,616

(22) Filed: May 31, 2001

(65) Prior Publication Data

US 2001/0049283 A1 Dec. 6, 2001

(30) Foreign Application Priority Data

May 31, 2000 (GB) .............................. 0013251

(51) Int. Cl.
*H04M 3/42* (2006.01)

(52) U.S. Cl. .............. 455/416; 379/202.01; 379/207.01
(58) Field of Classification Search ................. 455/416, 455/445, 450; 379/202.01, 204.01, 205.01, 379/207.01

See application file for complete search history.

(56) References Cited

U.S. PATENT DOCUMENTS

| 5,200,951 | A | * | 4/1993 | Grau et al. .................... 370/62 |
| 5,327,492 | A | * | 7/1994 | Parola ......................... 379/361 |
| 5,406,513 | A | * | 4/1995 | Canaris et al. .............. 365/181 |
| 6,028,921 | A | * | 2/2000 | Malik et al. ................. 379/201 |
| 6,324,279 | B1 | * | 11/2001 | Kalmanek, Jr. et al. .... 379/229 |
| 6,363,246 | B1 | * | 3/2002 | Williams et al. ............ 455/403 |
| 6,519,447 | B1 | * | 2/2003 | Chang et al. ............... 455/11.1 |
| 6,574,469 | B1 | * | 6/2003 | Xiang et al. ................ 455/416 |
| 2002/0181444 | A1 | * | 12/2002 | Acampora ................... 370/352 |

FOREIGN PATENT DOCUMENTS

| EP | 0689303 | 12/1995 |
| WO | 9929126 | 6/1999 |
| WO | 0143351 | 6/2001 |

OTHER PUBLICATIONS

"Specification of the Bluetooth System; Wireless connections made easy; Core; v1.0B", Bluetooth Specification Version, XX, XX, vol. 1, Dec. 1, 1999 (pp. 495–516, XP002159412, p. 506, para. 4.1.

* cited by examiner

*Primary Examiner*—Creighton Smith
(74) *Attorney, Agent, or Firm*—Banner & Witcoff, Ltd.

(57) ABSTRACT

A conference call facility is described in which one (2a) of a group of communication devices (2a,2b,2c,2d) connected to a low power radio frequency network (9) is able to set up a call to a party external of the network (9) and then selectively add further devices (2a,2b,2c) to the call under the control of the user of the one device (2a). The users of the other devices (2b,2c) are able to enable or disable the selection of their device in a conference call. One or more of the communication devices may be a mobile radio telephone equipped with the necessary network interface (1).

41 Claims, 3 Drawing Sheets

CONFERENCE CALL METHOD AND APPARATUS THEREFOR

BACKGROUND OF THE INVENTION

The present invention relates both to a method and to apparatus for establishing a conference or multi-party call including members of a wireless local area network, particularly, although not exclusively, a low power radio-frequency network (LPRF).

The development of wireless local area networks has stemmed from a desire to replace the cabling and line of sight techniques presently required to connect modern digital electronic equipment such as personal computers, printers, facsimile machines and the like. In addition, the network confers the further advantage of enabling users to form relatively small ad hoc networks or piconets which can bridge to existing voice and data networks and, indeed, another piconet to form a multiple piconet structure or scatternet.

A digital device capable of utilising a wireless local area network will be provided with a module providing additional functionality in the form of a radio unit, a link control unit, link management and the relevant software including that necessary to interface with the functionality of the device. It has been proposed to provide cellular radio telephone with such a module. Once connected to the network a user of the telephone should be able to transfer data such as phone book entries, for example both to and from his telephone to other devices such as a personal computer, a printer or the like attached to the network.

A traditional use of telephones for group working has been conferencing. Traditionally, a conference call has been established using the Public Switched Telephone Network (PSTN). Such a call to multiple participants requires the establishment, over the PSTN of a number of connections.

Consequently, a conference call has been much more expensive in terms of both network resources and subscriber charges than a typical point to point call. Furthermore, it can be difficult and time-consuming to set up a conference call particularly if a language barrier exists in dealing with a network operator.

It is thus an aim of the present invention to attempt to reduce the cost and complexity involved in making a conference call. It is a further aim of the invention to seek to provide a conference call facility on a network having only limited telephony resources.

SUMMARY OF THE INVENTION

According to a one aspect of the invention there is provided a communications device for performing conferencing, the device being operable in a first radio communications network and a second different radio communications network and comprising a first transceiver for establishing a channel for connection in the first network and a second transceiver for establishing a channel for connection in the second network and a controller for establishing a call in the first network and routing the call through the channel in the second network.

Preferably, the memory will hold data indicative of whether a particular member of the first network is available to be joined or added to a call. Conveniently, the member of the network will be able to indicate to the first network whether he is available for inclusion in the conference call. Thus, in the event that the user does not wish to be disturbed or is perhaps involved in a separate call, he can indicate as such to the network which will result in the relevant data being held in the memory of the device.

Again preferably, the user of the device may dismiss or remove a member of the first network from the call. Alternatively, the member of the first network taking part in a call may request or order that he be removed from the call. The former situation might arise where network conditions are such that a reliable connection of acceptable quality of service (QoS) cannot be maintained over the network connection, for example. The latter situation might arise where the member leaves the network perhaps through moving out of range.

According to another aspect of the present invention, there is provided a method of performing conferencing using a communications device and comprising establishing a channel for connection in a first network, establishing a channel for connection in a second different network, establishing a call in the first network and routing the call through the channel in the second network.

According to yet another aspect of the present invention, there is provided a radio communications system comprising a base station of a second radio communications network and a plurality of communication devices forming a first wireless communications network, at least one of which devices being operable in the first radio communications network and the second different radio communications network and comprising a first transceiver for establishing a channel for connection in the first network and a second transceiver for establishing a channel for connection to the base station in the second network and a controller for establishing a call in the first network and routing the call through the channel in the second network.

It will be appreciated in relation to the above described aspects of the invention, that the first radio communications network can be a Low Power Radio Frequency Network (LPRF) whilst the second radio communications network can be a mobile cellular radio network as exemplified by GSM.

Depending on the requirements of each network, the transceivers may be required to operate simultaneously. Furthermore, although separate transceivers could be employed for each network, they could be substituted for a single transceiver capable of operating in more than one network.

BRIEF DESCRIPTION OF THE DRAWINGS

In order to understand the invention more fully, an embodiment thereof will now be described by way of example and with reference to the accompanying drawings, in which.

In the following description although reference is made to protocols defined under the Bluetooth—Low Power Radio Frequency (LPRF) network specification, this is intended to be merely illustrative and is not intended in any manner to be limiting.

DETAILED DESCRIPTION OF THE INVENTION

Figure 3:
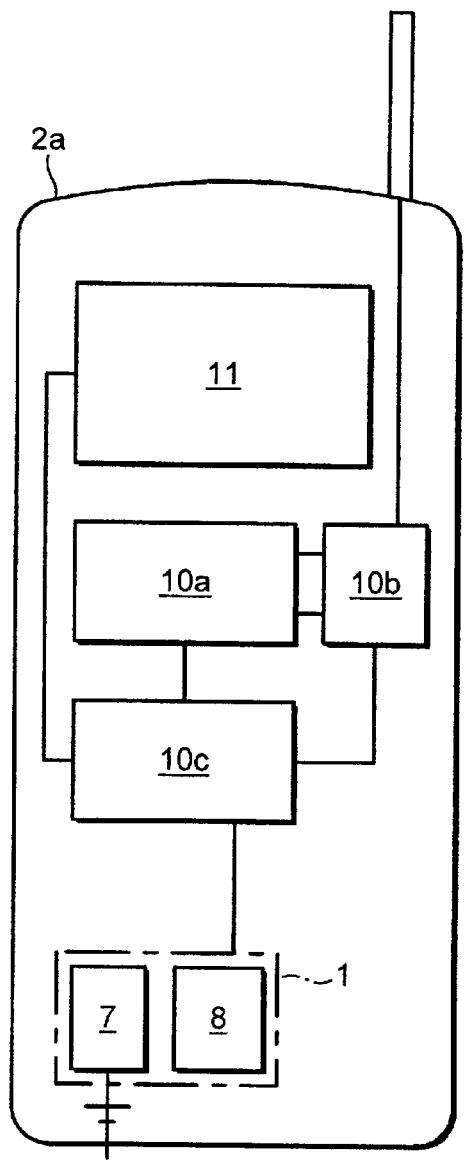
FIG. 3, is a schematic view of a communication device for use in the method of FIG. 1.

Referring to the Figures, there is shown a collection of devices each equipped with a LPRF module 1 (see FIG. 3).

The devices include a number of cellular radio telephones 2a,2b,2c,2d. As is well known, each radio telephone or mobile station 3 forms part of a public land mobile network (PLMN) 4 which through various gateways 5 may in itself be linked to other networks such as a PSTN 6.

Referring to FIG. 3, there is shown a communication device namely a radio telephone 2a including the well known baseband 10a, RF 10b, and processor 10c components which together permit the telephone to operate within the PLMN. The telephone 2a further includes the LPRF module 1 that contains a radio unit 7 that provides an air interface that complies with Federal Communications Commission (FCC) rules for the Industrial, Scientific and Medical (ISM) band at power levels up to 0 dBm. The interface operates in a frequency-hopping mode that results in a spread spectrum operation in the range of 2.402 GHz to 2.480 GHz with a 1 MHz separation. The nominal link range is 0.1 m to 10 m extensible to 100 m with an increased transmit power. A full description of the air interface can be found in the reference document Bluetooth specification Version 1.0B at http://www.bluetooth.com.

The module 1 further contains a baseband section 8 that contains the hardware providing the digital signal processing functions necessary to carry out baseband protocols and low-level link routines. The baseband section 8 supports both synchronous and asynchronous connection types, the first of which is used for voice and the second for data. Further explanation of the baseband section 8 can be found in the abovementioned reference document.

The module 1 also includes software providing both Link management and a top layer providing a framework for interoperability with existing specifications such as TCP/IP as well as the functionality necessary to provide audio communication and voice calls, for example. Again, further explanation of the link management layer and software framework may be found in the abovementioned reference document.

Figure 1:
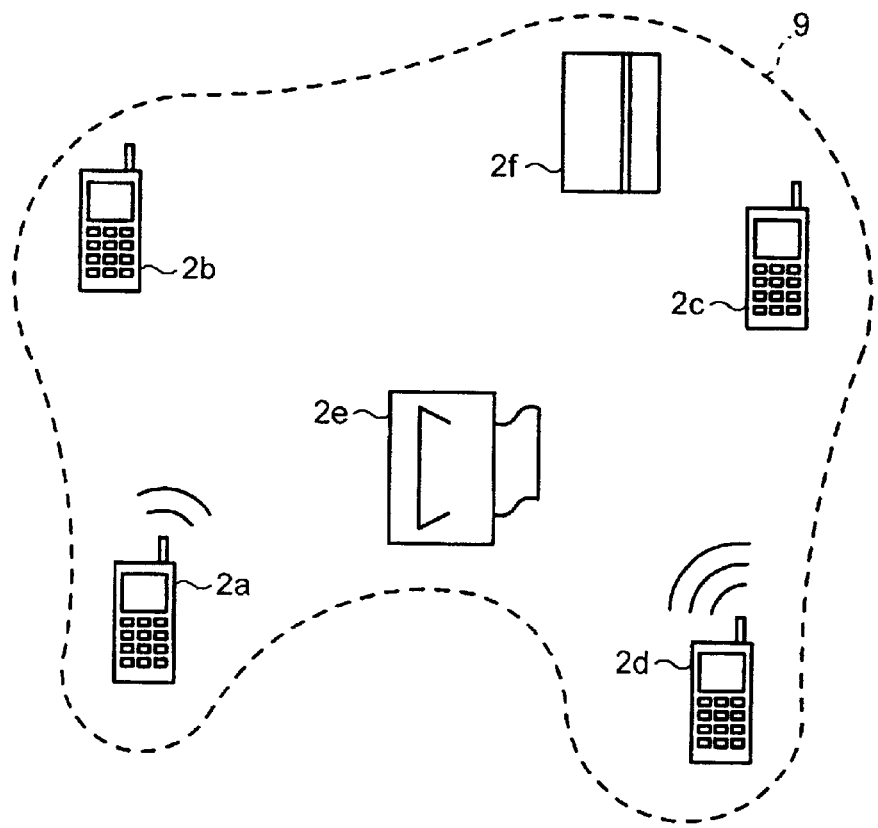
FIG. 1 is a diagrammatic view of a network engaged in a multi-party or conference call according to a method of the present invention.
Figure 1:
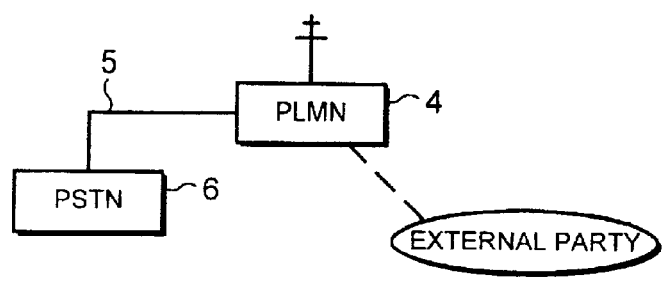
Figure 2:
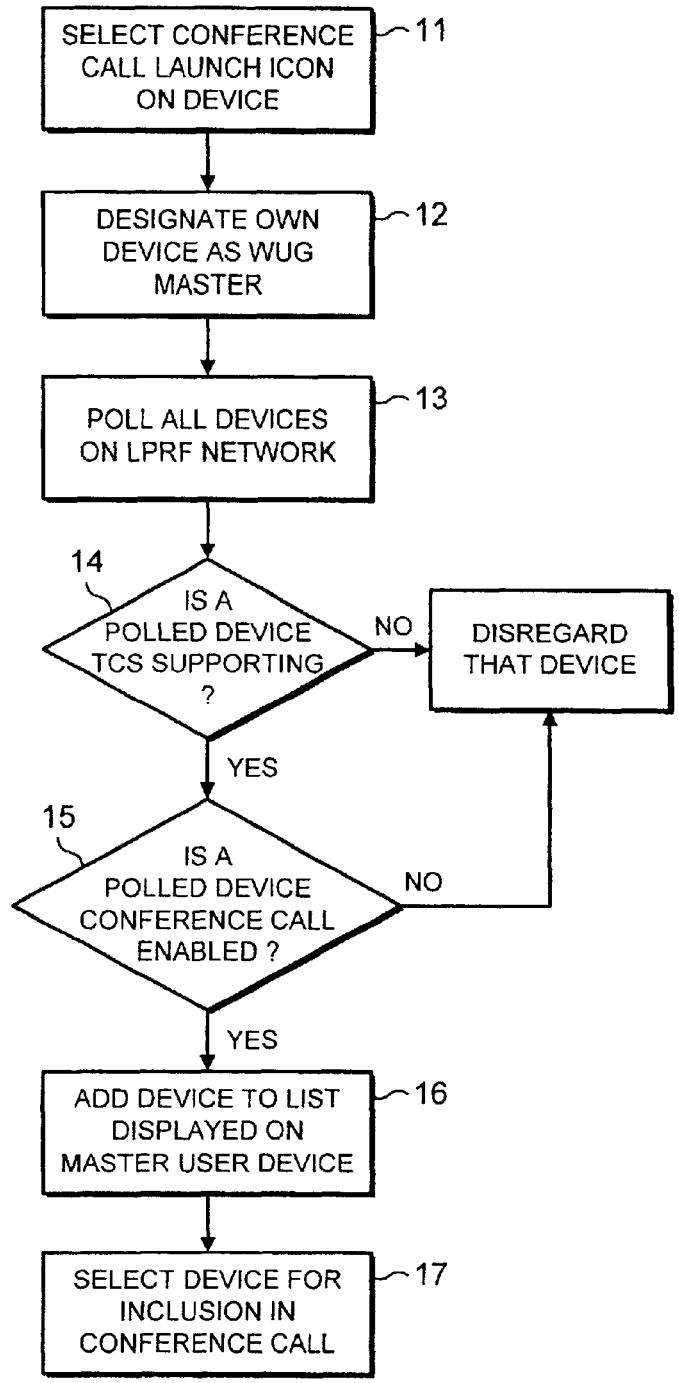
FIG. 2, is a flowchart illustrating the steps taken in establishing the multi-party call of the method of FIG. 1.

Referring to FIG. 1 in particular, the devices 2 are shown forming an ad-hoc piconet (shown bounded by the chain line 9) in which a connection-oriented L2CAP channel pre-exists between the devices 2 as defined in the abovementioned reference document. However, in order to undertake a multi-party or conference call a wireless user group (WUG) must be in place. For a device to form part of the WUG, it must be equipped with a LPRF module 1 that is capable of supporting the telephony Control Specification (TCS) set out in the abovementioned reference. Thus, in the present embodiment, the cellular radio telephones 2a,2b,2c,2d are so equipped whilst devices such as a printer 2e and a card reader 2f shown in FIG. 1 are not.

A conference call is initiated by a user, hereinafter referred to as the master user, of a radio telephone 2a who is already involved in a call via the PLMN 4 to a third party, it being immaterial who initiated the call. Assuming a call is in progress, the master user firstly selects via a graphical interface shown on a LCD display 11 of the radio telephone 2a, a conference call set-up icon. Selecting the icon launches the following steps in the formation of a Wireless User Group made up of those devices 2a,2b,2c,2d within the existing piconet 9 that support the TCS protocol: Firstly, the LPRF module 1 processes the instruction selected by the master user by designating 12 itself as a WUG Master. As WUG Master, the module 1 begins polling 13 the known devices 2 of the piconet 9 to determine which are both capable of and willing to join a conference call. Whether a device is capable of joining a conference call will, of course, depend on whether it supports the TCS protocol. If the polled device does support this protocol 14, the next step is to determine whether the device has been configured with the facility to join a WUG enabled 15. Clearly, in some instances it may not be desirable for the device 2 to join a conference call, for example where the device 2d is engaged in an incompatible activity such as carrying out an independent telephone call over the PLMN 4. Alternatively, the facility to join a conference call may be manually disabled by a user who perhaps does not wish to be disturbed. In either case, the facility may be most conveniently placed under software control and accessed via a graphical user interface displayed on the device 2. Once the WUG Master has determined which devices are available to join a conference call, the Master user is provided 16 on the display of his radio telephone 2a with a list of those devices 2b,2c, from which he may select 17 to join the conference call, subject, of course, to any limitations on the support for concurrent connections within the piconet 9. Thus, the Master user may selectively add devices 2 to the conference call following which step, a voice connection is established between the selected device 2 and the call taking place between the master user and the third party. The Master user can repeat this step with as many devices 2 as required, up to any limit provided by the LPRF networking protocol with the result that the users of all the selected devices 2b,2c, the Master user's device 2a are connected to each other and to the third party.

In addition to adding to additional devices 2 to a conference call, the Master user may also selectively dismiss devices 2 from the conference call via a list of joined devices 2 displayed on his radio telephone 2a. In addition, a user of a joined device 2b,2c may select an icon on a display of his own device 2b,2c to dismiss his device 2b,2c from the conference call. Furthermore, in the event that the Master user ends his call with the third party this will automatically end the conference call and cause all the joined devices 2b,2c to be dismissed. It should be noted that the step of adding or dismissing a device 2 from a conference call is a dynamic process and in no sense does dismissing a device 2 from a call prevent its re-entry at a later stage at the request of the master user subject of course to the dismissed device 2 disabling the conference call facility by the methods described above.

It will be appreciated by those skilled in the art that the security of the conference call is dependent on the particular networking protocol under which the LPRF network operates. For example, the Bluetooth security protocols provide the security necessary to prevent eavesdropping on any communication between devices connected to a network. The devices may also be able to support other forms of shared information such as multimedia content in addition to voice. Furthermore, although the above described embodiment describes a group of interfaced cellular radio telephones, it should be understood that the invention is equally applicable to a wireless local network in which not all the devices include means for communicating externally of the network including, but not limited to, such devices as multimedia personal computers, cordless handsets and the like.

What is claimed is:

1. A communications device for performing conferencing, the device comprising:
   a first transceiver for communicating in a wireless low power radio frequency network;
   a second tranceiver for communicating in a wireless telecommunications network; and a controller configured to control the device to establish a channel for communication with at least one further communications device in the wireless low power radio frequency network, the at least one further communications device being operable to communicate in the wireless low power radio frequency network and also in the wireless telecommunications network, the controller further being configured to control the device to establish a channel for communicating with a destination in the wireless telecommunications network and to provide a communication link for the at least one further communications device to communicate with the destination by routing a call in the wireless telecommunication network through the wireless low power radio frequency network to the at least one further communications device.

2. A device as claimed in claim 1, wherein the controller is operable to selectably add members of the first network to the call.

3. A device as claimed in claim 2, including a memory holding data relating to current members of the first network from which the controller selects members to add to the call.

4. A device as claimed in claim 1, wherein the controller is operable to remove a member of the first network from the call.

5. A device as claimed in claim 3, wherein the controller, in accordance with data held in the memory, is inhibited from the selection of a current member of the first network for addition to the call.

6. A device as claimed in claim 1, wherein the second transceiver is adapted for use in a cellular mobile radio network.

7. A device as claimed in claim 2, wherein the controller is operable to remove a member of the first network from the call.

8. A device as claimed in claim 3, wherein the controller is operable to remove a member of the first network from the call.

9. A device as claimed in claim 8, wherein the controller, in accordance with data held in the memory, is inhibited from the selection of a current member of the first network for addition to the call.

10. A device as claimed in claim 2, wherein the second transceiver is adapted for use in a cellular mobile radio network.

11. A device as claimed in claim 3, wherein the second transceiver is adapted for use in a cellular mobile radio network.

12. A device as claimed in claim 4, wherein the second transceiver is adapted for use in a cellular mobile radio network.

13. A device as claimed in claim 5, wherein the second transceiver is adapted for use in a cellular mobile radio network.

14. A device as claimed in claim 1, wherein the first and second transceiver is adapted for use in a cellular mobile radio network.

15. A method, in a wireless communications device, for performing conferencing, the method comprising:
  establishing a first channel for communicating with a destination in a first wireless telecommunications network;
  establishing a second channel for communicating with at least one further communications device in a second network, the second network being a wireless low power radio frequency network, the at least one further communications device being operable to communicate in the first and second networks; and
  providing a communications link to enable the at least one further communications device to communicate with the destination by routing a call in the first network through the second channel and the second network to the at least one second communications device.

16. A method as claimed in claim 15, including selecting members of the first network to add to the cell.

17. A method as claimed in claim 15, including storing data relating to current members of the first network.

18. A method as claimed in claim 16, including storing data indicative of whether a member of the first network may be selected for addition to the call.

19. A method as claimed in claim 15, including removing a member of the first network from the call.

20. A method as claimed in claim 16, including storing data relating to current members of the first network.

21. A method as claimed in claim 17, including storing data indicative of whether a member of the first network may be selected for addition to the cell.

22. A method as claimed in claim 16, including removing a member of the first network from the call.

23. A method as claimed in claim 17, including removing a member of the first network from the call.

24. A method as claimed in claim 18, including removing a member of the first network from the call.

25. A first radio communications network including a communications device for performing conferencing, the device being operable in a first radio communications network and a second different radio communications network and comprising a first transceiver for establishing a channel for connection in the first network and a second transceiver for establishing a channel for connection in the second network and a controller for establishing a call in the first network and routing the call through the channel in the second network.

26. A radio communications system comprising:
  a base station of a wireless telecommunications network;
  a plurality of communication devices forming a wireless low power radio frequency network, at least a first one of the plurality of communications devices being operable in both the wireless low power radio frequency network and the wireless telecommunications, the at least one first communications device comprising:
    a first transceiver for communication in the low power radio frequency network;
    a second transceiver for communication in the wireless telecommunications network; and
    a controller, the controller being configured to control the at least one first communications device to establish a channel for communication with at least a second one of the plurality of communications device in the low power radio frequency network;
  wherein the at least one second communications device is operable to communicate in the low power radio freqeuncy network and also in the wireless telecommunications network, the controller is further configured to control the at least one first device to establish a channel for communicating with a destination in the wireless telecommunications network and to provide a communication link for the at least one second communications device to communicate with the destination by routing a call in the wireless telecommunication network through the wireless low power radio frequency network to the at least one second communications device.

27. A system as claimed in claim 26, wherein the controller is selectably operable and add members of the first network to the call.

28. A system as claimed in claim 26, wherein the device includes a memory holding data relating to current members of the first network.

29. A system as claimed in claim 26, in which the first transceiver is adapted for use in a low power radio frequency.

30. A system as claimed in claim 26, in which the second transceiver is adapted for use in a cellular mobile radio network.

31. A system as claimed in claim 27, wherein the at least one first communications device includes a memory holding data relating to current members of the first network.

32. A system as claimed in claim 27, in which the second transceiver is adapted for use in a cellular mobile radio network.

33. A system as claimed in claim 28, in which the second transceiver is adapted for use in a cellular mobile radio network.

34. A system as claimed in claim 29, in which the second transceiver is adapted for use in a cellular mobile radio network.

35. A wireless low power radio frequency network including a communications device for performing conferencing, the device comprising:
   a first transceiver for communicating in the wireless low power radio frequency network;
   a second transceiver for communicating in a wireless telecommunications network; and
   a controller configured to control the device to establish a channel for communication with at least one further communications device in the wireless low power radio frequency network, the at least one further communications device being operable to communicate in the wireless low power radio frequency network and also in the wireless telecommunications network and to provide a communication link for the at least one further communications device to communicate with the destination by routing a call in the wireless telecommunication network through the wireless low power radio frequency network to the at least one further communications device;
   wherein the controller is operable to selectably add members of the first network to the call.

36. The wireless low power radio frequency network of claim 35, the communications device further including a memory holding data relating to current members of the first network from which the controller selects members to add to the call.

37. The wireless low power radio frequency network of claim 36, wherein the controller, in accordance with data held in the memory, is inhibited from the selection of a current member of the first network for addition to the call.

38. A wireless low power radio network including a communications device for performing conferencing, the device comprising:
   a first trasceiver for communicating in the wireless low power radio frequency network;
   a second transceiver for communicating in a wireless telecommunications network; and
   a controller configured to control the device to establish a channel for communication with at least one further communications device being operable to communicate in the wireless low power radio frequency network and also in the wireless telecommunications network, the controller further being configured to control the device to establish a channel for communicating with a destination in the wireless telecommunications network and to provide a communication link for the at least one further communications device to communicate with the destination by routing a call in the wireless telecommunication network through the wireless low power radio frequency network to the at least one further communications device; wherein the controller is operable to selectably add members of the first network to the call;
   wherein the controller is operable to remove a member of the first network from the call.

39. A wireless low power radio network including a communications device for performing conferencing, the device comprising:
   a first transceiver for communicating in the wireless low power radio frequency network;
   a second transceiver for communicating in a wireless telecommunications network; and
   a controller configured to control the device to establish a channel for communication with at least one further communications device in the wireless low power radio frequency network, the at least one further communications device being operable to communicate in the wireless low power radio frequency network and also in the wireless telecommunications network, the controller further being configured to control the device to establish a channel for communicating with a destination in the wireless telecommunications network and to provide a communication link for the at least one further communications device to communicate with the destination by routing a call in the wireless telecommunication network through the wireless low power radio frequency network to the at least one further communications device;
   wherein the second transceiver is adapted for use in a cellular mobile radio network.

40. A method, in a wireless communication device, for performing conferencing comprising:
   establishing a channel for communicating with a further communications device in a wireless low power radio frequency network; and
   communicating with a destination in a wireless telecommunications network by routing a call to the further communications device through the low power radio frequency network for forwarding, by the further device, to the destination in the wireless telecommunications network;
   wherein the wireless communications device is operable to communicate in the wireless low power radio frequency network and also in the wireless telecommunications network.

41. A communications device for performing conferencing, the device comprising;
   a first transceiver for communicating in a wireless low power radio frequency network;
   a second transceiver for communicating in a wireless telecommunications network; and
   a controller configured to control the device to establish a channel for communication with a further communications device in the wireless low power radio frequency network, and for communicating with a destination in the wireless telecommunications network by routing a call to the second communications device through the wireless low power radio frequency network for forwarding, by the second device, to a destination in the wireless telecommunications network.

* * * * *